Figures 1, 2:
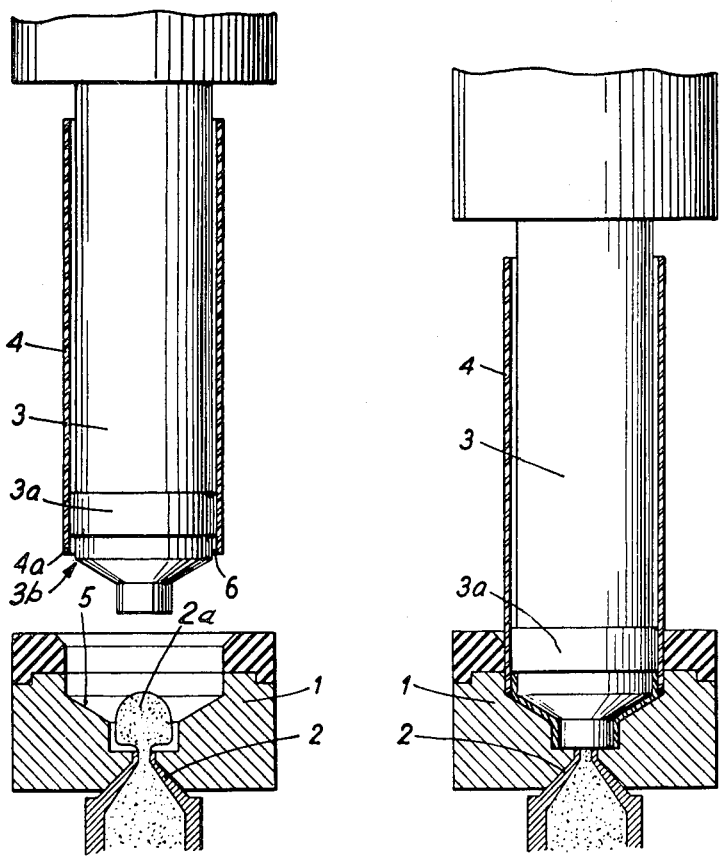

June 14, 1966            L. HAUF            3,256,378

METHOD OF FABRICATING PACKING TUBES OF THERMOPLASTIC MATERIAL

Original Filed May 26, 1960

INVENTOR.

*LAZARE HAUF*

United States Patent Office 3,256,378
Patented June 14, 1966

3,256,378
METHOD OF FABRICATING PACKING TUBES
OF THERMOPLASTIC MATERIAL
Lazare Hauf, Boissonnet 11, Lausanne, Switzerland
Continuation of abandoned application Ser. No. 31,988,
May 26, 1960. This application Feb. 19, 1964, Ser. No.
346,042
2 Claims. (Cl. 264—267)

This is a continuation of my application Serial No. 31,988, filed May 26, 1960, now abandoned.

My present invention relates to a method of fabricating packing tubes of thermoplastic material, in the course of which a headpiece is molded and welded to the rim or end portion of a preformed tubular body. The preformed body is first mounted on a mandrel and the mandrel and body are advanced into the cavity of a die into which heat-softened thermoplastic of a measured amount intended to form the headpiece is introduced substantially simultaneously with the advancement of the mandrel and tubular body.

A process is known in which a globule of material of predetermined volume is cut and severed at the mouth of the nozzle of a plastifying device and then falls into the die cavity. Said known process presents various inconveniences. In the first place, there is little probability that the globule, when it falls into the cavity, will place itself exactly into the center of the cavity nor that it will assume a momentarily self-sustained, symmetrical shape, with the resulting disadvantages of poor material distribution and increased heat loss during the molding operation. These advantages are avoided by my invention, as will be evident from the description to follow. Further, the cutting tools which sever the globule from the nozzle tend to form streaks and alter the size of the globule which makes exact control of the volume of the globule difficult and could foul the tools. Moreover, because of the space required for the plastifying means and the cutting tool, machine design considerations dictate that the mandrel should be positioned at an operating station other than that at which the globule falls into the die cavity. The globule thus loses a substantial amount of heat during the time interval elapsing between its fall, the indexing of the die to the mandrel station and the beginning of the operation of the mandrel, and therefore some of the advantage of lower plastifying temperature normally attributed to this type of process is lost. This raises the risk of a poor or imperfect weld being obtained between the headpiece and the tubular body.

My invention overcomes these disadvantages and inconveniences by a measure which in itself is very simple and consists in introducing a metered quantity of viscous thermoplastic material into the die cavity through a central orifice in the die under low pressure so that a symmetrically disposed globule is formed, against which the mandrel, desirably aligned on the same axis as the die, may be rapidly and simultaneously advanced to pressure-shape the headpiece.

My improved process is distinguished from another known process in which the material from which the headpiece is molded is introduced into the cavity in form of powder or of a solid ball which then is rendered plastic in the cavity by electrical heating at high frequency. This known process presents inconveniences of which the principal ones are the following:

(a) It is not suitable when the material is polyethylene;

(b) When the material is polyvinylchloride or another thermoplastic material of which the melting temperature is very close to the temperature of decomposition, in particular when the material is exposed to the air, it runs the risk of being deteriorated by local overheating;

(c) The production rate is retarded by reason of the fact that the time required for distributing the material in the cavity by the mandrel is augmented by the time required for plastification by heating, and this time is relatively long, particularly if it is aimed to avoid local overheating.

The method disclosed by my present invention also is clearly distinguished from well-known processes in which the headpiece is molded by injection. Above all, the process set out by my invention presents the advantage, with respect to said injection molding, of requiring a substantially lower pressure for extruding the material into the molding cavity, since the material is introduced into an open cavity instead of being forced between the very narrow walls of a closed mold.

Two phases of one embodiment of the method disclosed by my invention are shown in the drawings, in which FIGURES 1 and 2 are longitudinal sections of a simplified apparatus illustrated in two positions corresponding to these phases.

Numeral 1 designates a die seated on a nozzle 2 for introducing a thermoplastic material into the die through an orifice in the center of the end wall of the die. Nozzle 2 is disposed on the end of a plastifying device, not shown, for heating said material and feeding the nozzle. Said device may be very simple in itself by reason of the low pressure that is required. The material is heated to a viscous state and then is introduced into the die cavity to form a self-sustained globule 2a which momentarily assumes a centered and generally symmetrical disposition within the die cavity, substantially as illustrated in FIGURE 1.

Numeral 3 designates a mandrel connected to a mechanism, not shown, by means of which it can be moved between the positions shown in FIGS. 1 and 2. The mandrel is provided with a collar 3a and a configurated end face 3b which is of substantially mating configuration with recess 5 of the die 1 and into which the end face is adapted to enter to a predesigned position to shape the headpiece.

Tubular body 4, made by a well known practice such as extrusion, is cut to predetermined length and then placed over mandrel 3 so that it is interiorly engaged by collar 3a and protrudes at one end a predetermined distance beyond the collar in a rim or end portion 4a surrounding the mandrel face in spaced relation. This provides an annular space 6 between the rim portion 4a and the cylindrical wall of mandrel face 3b, which space constitutes a portion of a closed cavity formed by bringing the mandrel with the tubular body thereon into a fixed position within recess 5. It will be seen that any amount of the globule 2a not required to fill the space between the end walls of cavity 5 and mandrel face 3b will be forced into and is accommodated by this annular space 6. This ensures that the welding or fusing of the headpiece is effected on a substantial length of body 4, preferably on the entire length of end portion 4a, the extent of which depends on the minor variations in the metered volume of the globule.

Preferably, descent of mandrel 3 and tubular body 4 into cavity 5 is effected substantially simultaneously with the introduction of globule 2a. This enables faster operation and incurs only negligible heat loss when the initially centered and symmetrical globule is pressed between the mandrel face and die cavity walls, thus ensuring the maximum residual heat in the headpiece material for its shaping and welding to end portion 4a of the tubular body.

When tubes are fabricated of polyvinylchloride or a related material in accordance with the process described, die 1 and mandrel 3 may be advantageously used as electrodes of a high-frequency heating device. Such additional heating serves above all for welding the headpiece to the rim 4a of tube 4. If required, such heating may be utilized during molding of the headpiece to compensate for the heat loss of the material when it contacts the die and mandrel. The material thus is maintained at a temperature at which it is welded to the adjacent rim 4a of the tubular body. The headpiece even could be let cool down completely, whereupon welding may be effected by high-frequency heating.

The process disclosed by my invention also may be applied to the fabrication of tubes having a bottom, for example a flat bottom, in lieu of the headpiece.

What is claimed is:

1. A method of fabricating a collapsible tube of thermoplastic material using a male die part provided with a shaping face having a reduced, peripheral surface adjacent its end and a female die part provided with an open recess cavity to receive and mate with said shaping face upon moving said parts together to define a molding cavity for shaping a headpiece on an end of the tube, comprising the steps of placing over said male part a preformed tubular element with an end portion thereof positioned in protruding, concentrically spaced relation to said reduced surface of said male die part and defining therewith a narrow annular space, injecting at relatively low pressure and temperature into the bottom zone of said cavity a well defined amount of viscous plasticized thermoplastic material in the form of a momentarily symmetrical self-sustaining globule, and rapidly forcing said die parts together to position said end portion of said element within said recess cavity and to pressure-shape said globule within the confines of said molding cavity whereby a portion of said globule flows into said annular space and fuses with said end portion of said tubular element.

2. The method of claim 1 wherein said globule is metered into said cavity in an amount not in excess of the combined volume of said annular space and the space between said die parts when forced together.

References Cited by the Examiner
UNITED STATES PATENTS

| | | |
|---|---|---|
| 1,754,496 | 4/1930 | Barker. |
| 2,724,863 | 11/1955 | Gudge et al. |
| 2,871,515 | 2/1959 | Loew _____ 18—42 |

ROBERT F. WHITE, *Primary Examiner.*

F. MARLOWE, *Assistant Examiner.*